United States Patent [19]
Braat

[11] 4,051,527
[45] Sept. 27, 1977

[54] FOCUS DETECTION SYSTEM FOR A VIDEO DISC PLAYER USING A PLURALITY OF RADIATION SENSORS IN THE FAR FIELD OF THE INFORMATION STRUCTURE

[75] Inventor: Josephus Johannes Maria Braat, Eindhoven, Netherlands

[73] Assignee: U.S. Philips Corporation, New York, N.Y.

[21] Appl. No.: 669,641

[22] Filed: Mar. 23, 1976

[30] Foreign Application Priority Data

Jan. 28, 1976  Netherlands ............... 7600843

[51] Int. Cl.² .................. H04N 5/76; G11B 7/12
[52] U.S. Cl. .................. 358/128; 179/100.3 G
[58] Field of Search ......... 178/6.7 A, 6.6 R, 6.6 DD; 340/173 LM; 179/100.3 V, 100.3 G, 100.3 M, 100.3 D, 100.3 R, 100.41 D; 250/201, 202

[56] References Cited

U.S. PATENT DOCUMENTS

| 3,876,841 | 4/1975 | Kramer et al. | 179/100.3 V |
| 3,876,842 | 4/1975 | Boowhuis | 179/100.41 L |
| 3,913,076 | 10/1975 | Lehureau et al. | 340/173 LT |
| 3,932,700 | 1/1976 | Snopko | 178/6.6 R |
| 3,962,720 | 6/1976 | Braat | 179/100.3 V X |
| 3,962,721 | 6/1976 | De Haan | 178/6.6 R X |
| 3,971,002 | 7/1976 | Bricot et al. | 340/173 LT |
| 3,974,327 | 8/1976 | Van Dijk | 178/6.6 R |
| 4,006,293 | 2/1977 | Bouwhuis et al. | 179/100.3 G X |

Primary Examiner—John H. Wolff
Attorney, Agent, or Firm—Frank R. Trifari; Simon L. Cohen

[57] ABSTRACT

An apparatus is described for reading a record carrier, on which information, for example video and/or audio information, is stored in an optically readable track-shaped information structure. Errors in the focussing of a read beam relative to the plane of the information structure can be detected with the aid of two detectors which are disposed in the far field of the information structure, which detectors are arranged at one side of a plane defined by the optical axis of an objective system and a line which effectively extends transversely to the track direction and which longitudinal direction are effectively transverse to the track direction. With the aid of the same detectors a reference signal is obtained, which is employed for deriving a control signal for focussing correction of the read beam.

11 Claims, 14 Drawing Figures

FOCUS DETECTION SYSTEM FOR A VIDEO DISC PLAYER USING A PLURALITY OF RADIATION SENSORS IN THE FAR FIELD OF THE INFORMATION STRUCTURE

The invention relates to apparatus for reading a record carrier on which information, for example video and/or audio information, is stored in an optically readable track-shaped information structure. The apparatus comprises a radiation source, and an objective system for passing radiation obtained from the radiation source to a radiation-sensitive information detection system via the record carrier, which detection system converts the read beam supplied by the radiation source and modulated by the information structure into an electrical signal. The apparatus furthermore comprises a focussing detection system which is connected to an electronic circuit for deriving a control signal for correcting the focussing of the objective system relative to the plane of a track portion to be read.

A focussing detection system is to be understood to mean a radiation-sensitive detection system and supplies an electrical signal which provides an indication of a deviation between the plane of focussing of the objective system and the plane of a track portion to be read.

Such an apparatus is inter alia known from the applicant's U.S. Pat. No. 3,876,841, issued Apr. 8, 1975. The record carrier described therein for example stores a color television program. The information structure consists of a spiral track which comprises a multitude of pits which are pressed into the record carrier, the luminance information being contained in the frequency of the pits, while the chrominance and audio information is contained in a variation of the lengths of the pits. A read beam is focussed at the information structure to a radiation spot whose dimensions are the order of magnitude of those of the pits. By moving the record carrier relative to the read beam, said beam is modulated in accordance with the stored information. A radiation-sensitive information detector converts the modulation of the read beam into an electrical signal. This signal is processed in an electronic circuit, so that it becomes suitable to be applied to color television receiving apparatus.

The objective system used in the read apparatus has a large numerical aperture and a small depth of focus. Consequently, it is always necessary to sharply focus at the information structure. Deviations between the desired position of the plane of focussing and the actual position of this plane, which deviations may be caused by errors in the position of the record carrier or warping of the record carrier, or vibrations of the elements in the read apparatus, must be detected constantly, and the focussing must be corrected with the basis thereof.

In the apparatus in accordance with the U.S. Pat. No. 3,876,841 focussing errors are detected with the aid of a separate focussing beam. This beam which is derived from the read beam, traverses the objective system obliquely and is comparatively narrow. By means of the objective system the focussing beam which is reflected by the record carrier, is focussed to a radiation spot in the plane of two radiation-sensitive detectors. The degree of symmetry of the radiation spot relative to the detectors provides an indication of the degree of focussing of the read beam on the information structure. In addition to the optical elements required for the actual read-out, the known apparatus requires optical auxiliary elements for detecting focussing errors.

It is an object of the present invention to provide a read apparatus in which focussing errors can be detected with the aid of a minimal number of additional optical elements. The apparatus in accordance with the invention is therefore characterized in that the focussing detection system is constituted by two radiation sensitive detectors which are disposed in the far field of the information structure at one side of a plane defined by the optical axis of the objective system and a line normal to the center line of a track portion to be read, the detectors being disposed symmetrically relative to a line which effectively extends transversely to the track direction. The outputs of the detectors are connected both to a subtractor circuit and to an adder circuit, while the outputs of the adder circuit and the subtractor circuit are connected to a first and a second input of a multiplier circuit. One of the connections between the adder circuits and the multiplier circuit and between the subtractor circuit and the multiplier circuit includes a phase-shifting circuit, while the multiplier circuit is connected to a filter circuit which only transmits frequencies which are lower than the frequency which corresponds to twice the average spatial frequency of the information structure in the track direction. The control signal for focussing correction is available at the output of the filter circuit.

The phrase "the detectors are disposed in the far field of the information structure" is to be understood to mean that these detectors are located in a plane where the various diffraction orders of the read beam formed by the information structure are sufficiently separated; i.e. in a plane which is disposed sufficiently far from the image of the information structure formed by the objective system.

The phrase "a line effectively extends in the track direction or effectively extends transversely dto the track direction" is to be understood to mean that the imaginary projection of this line on the information structure is parallel to or transverse to the track direction respectively.

The invention is based on the recognition that during reading of the information structure, which behaves as a two-dimensional diffraction grating, focussing errors cause additional phase shifts between a zero-order sub-beam and higher-order sub-beams. In the far field these phase shifts are visible as a pattern of interference lines whose spatial period is determined by the degree of focussing. Focussing errors can then be detected solely with the aid of suitably disposed detectors and without additional optical elements or an auxiliary beam. In accordance with the invention, the sum of the detector signals is then used as a reference signal for deriving the control signal for focussing correction.

The signal which provides an indication of focussing errors and the reference signal are derived with the aid of the same elements. The advantage of this is that these signals are affected in substantially the same way by possible disturbances in the read system, such as optical noise or vibrations of the elements. Owing to the manner in which said signals are processed, namely via a so-called synchronous detection, the resulting control signal for focussing correction is independent of said disturbances. Another advantage is that the applicability of the invention is not limited to one specific phase depth of the information structure. Phase depth is to be understood to mean the difference in phase between the zero-order sub-beam and the first-order sub-beams caused by the information areas (or pits) of the information structure. The invention may also be used for reading so-called black-white structures or amplitude structures, whose phase depth may be assumed to be radians.

It is to be noted that it has been proposed previously, in the Applicant's U.S. Pat. No. 4,006,293, issued Feb. 1, 1977, to detect focussing errors with the aid of two detectors disposed in the far field of the information structure. However, in that case the sum of the detector signals is not used as a reference for deriving the focussing control signal. In the previously proposed apparatus a d.c. control signal is obtained with the aid of two detectors. For a dynamic detection of the focussing errors in the latter apparatus the track portion to be read and the read spot should be moved relative to each other periodically and transversely to the track direction. For this purpose either the record carrier or the read apparatus has to be adapted. The signals which provides an indication of focussing errors and the reference signal are then derived in different manners.

In the previously proposed read apparatus a first-order sub-beam which is diffracted in the direction transverse to the track direction instead of in the track direction is employed for detecting focussing errors.

A further advantage of the apparatus in accordance with the invention is that the location of the detectors within the left-hand or right-hand part of the effective exit pupil is not too critical. The detectors need not be disposed substantially symmetrically relative to the so-called "neutral line," as the detectors in the apparatus in accordance with the U.S. Pat. No. 4,006,293.

The concept: The effective exit pupil covers both the actual exit pupil of the objective system and an image of this exit pupil. Such an image can be formed if the exit pupil itself is not readily accessible. The concept "neutral line" will be explained hereinafter.

In accordance with a further feature of an apparatus in accordance with the invention the dimension of the detectors in the effective track direction is substantially smaller than the diameter of the effective exit pupil of the objective system. This embodiment enables comparatively large focussing errors to be detected.

An apparatus in accordance with the invention by means of which both large and small focussing errors can be detected with high accuracy, is characterized in that each of the detectors is subdivided into two sub-detectors and that the outputs of the outer sub-detectors, are connected via switches which are actuated by the derived control signal, and the outputs of the inner sub-detectors are connected directly to inputs of the adder circuit and the subtractor circuit.

An apparatus in accordance with the invention may also be characterized in that the detectors have the shape of isosceles triangles whose base sides effectivelfy extend transversely to the track direction. This enables an unambiguous control signal to be derived for a wide range of focussing errors.

In accordance with a further feature each of the triangular detectors may be subdivided into two isosceles triangular detectors.

A preferred embodiment of an apparatus in accordance with the invention with narrow detectors is characterized in that the detectors are disposed at the periphery of the effective exit pupil. The focussing detection system is then suitable for reading a record carrier in which the spatial frequency of the information areas is subject to substantial variations.

The invention will now be described in more detail with reference to the drawing, in which:

FIGS. 2, 2a, 6a, 6b, 7, 8a, 8b, 9, 10a and 10b show possible forms of the radiation-sensitive detection system used in this apparatus, and also illustrate how the signals supplied by this system are processed, and FIGS. 3, 4 and 5 clarify the principle of the invention.

Figure 1:
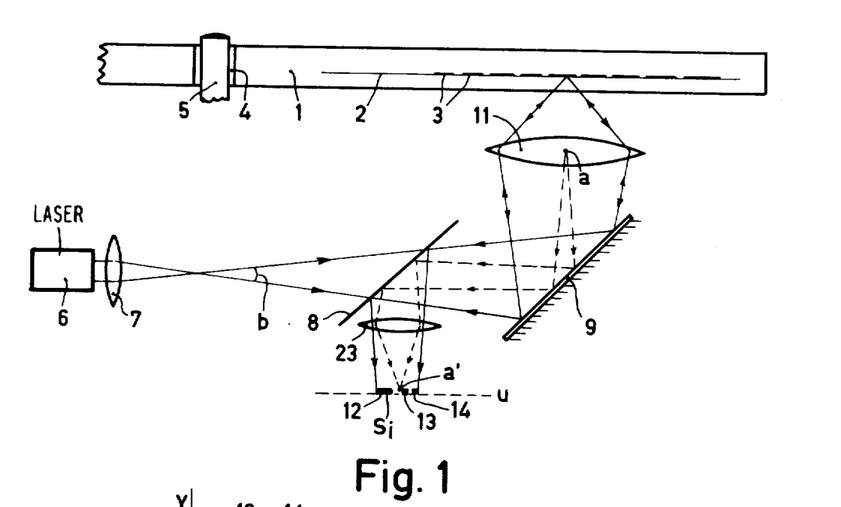
FIG. 1 shows an embodiment of an apparatus in accordance with the invention.

FIG. 1 shows a round disc-shaped record carrier 1 in radial cross-section. The information structure is assumed to be reflecting. The information tracks are designated 3. A radiation source 6, for example a helium-neon laser, emits a read beam $b$. This beam is reflected by the mirror 9 towards an objective system 11, which is schematically represented by a single lens. The path of the read beam $b$ includes an auxiliary lens 7 which ensures that the read beam fills the pupil of the objective system. Thus, a radiation spot of minimal dimensions is projected on the plane 2 of the information structure.

The read beam is reflected by the information structure and, when the record carrier is rotated about a spindle 5 which extends through a central opening 4, it is time-modulated in accordance with the information stored in the track to be read. The modulated read beam traverses the objective system again and is reflected by the mirror 9 in the direction of the beam which is emitted by the source. The radiation path of the read beam includes elements for separating the paths of the modulated and the unmodulated read beam. These elements may for example comprise an assembly of a polarization-sensitive dividing prism and a $\lambda/4$ plate. In FIG. 1 it has been assumed for the sake of simplicity that said means are constituted by a semi-transparent mirror 8. This mirror reflects a part of the modulated read beam to a radiation-sensitive information detector 12. At the output of this detector a signal Si is available. The signal Si may be decoded in known manner and subsequently, if a television program is stored on the record carrier, it can be rendered visible and audible with a conventional television receiving apparatus.

The optical details of the information structure are very small. For example, the width of a track is 0.5 $\mu$m, the track distance 1.2 $\mu$m, and the average spatial period of the pits 3 $\mu$m for a disc-shaped round record carrier on which a 30 -minute television program is stored within a ring with an inner diameter of 12 cm and an outer diameter of 27 cm.

In order to enable such small details to be read an objective system with a comparatively large numerical aperture (for example 0.45) is to be used. Such an objective system, however, has a small depth of focus, which is the reason why this beam should always remain sharply focussed at the information structure.

Figures 2, 2A:
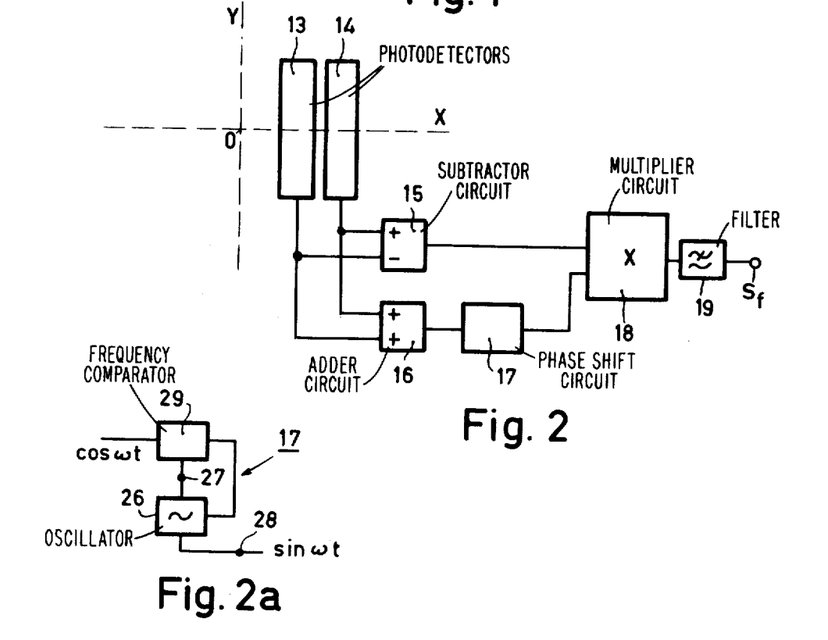

In order to enable focussing errors to be detected two additional detectors 13 and 14 are provided in addition to the detector 12. In FIG. 2 these detectors are shown in plan view. The origin O of the co-ordinate system OXY is located on the optical axis of the objective system. The X-axis and the Y-axis extend parallel to the longitudinal direction and transversely to the longitudinal direction of a track portion to be read respectively.

The detectors 13 and 14 are for example disposed in the plane U in which an image of the exit pupil of the objective system is formed by means of an auxiliary lens 23. For the sake of simplicity, only the image ($a'$) of a point $a$ of this exit pupil is represented in FIG. 1 by dashed lines. The detectors 13 and 14 may also be arranged in an other plane, provided that the sub-beams which are diffracted in different orders by the information structure are sufficiently separated in this plane.

As is further indicated in FIG. 2, the output signals of the detectors 13 and 14 are applied to a subtractor circuit 15. The output of this circuit is connected to a first input terminal of a multiplier circuit 18. By means of the adder circuit 16 the output signals of the detectors 13 and 14 are added and via a phase-shifting circuit 17, which shifts the phase of this signal by 90°, the resulting signal is applied to a second input of the multiplier circuit 18. The output signal of this circuit is applied to a low-pass filter 19. At the output of this filter, the desired control signal $S_f$ is obtained as will be explained hereinafter.

Figure 3:
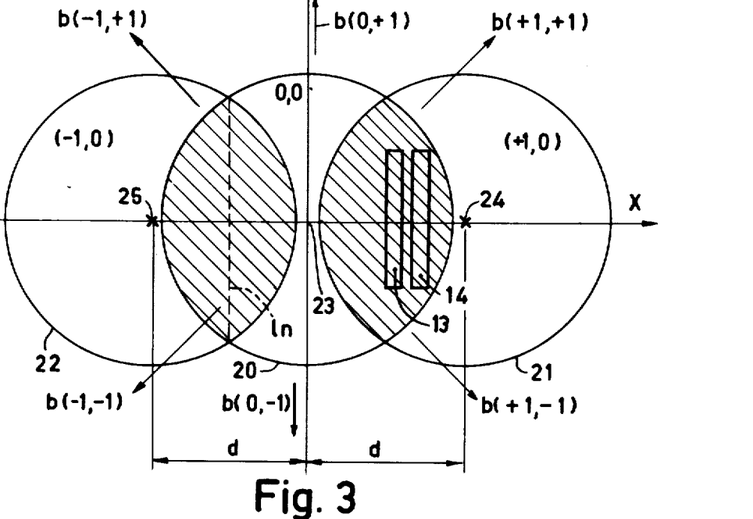

Now the physical backgrounds of the invention will be explained. The formation structure of the record carrier, which information structure consists of tracks which in their turn comprise a multitude of areas and intermediate areas, the areas for example being pits, may be regarded as a two-dimensional diffraction grating. This grating divides the read beam $b$ into a zero-order sub-beam, a number of first-order sub-beams and a number of higher-order sub-beams. A part of the radiation of the sub-beams passes through the pupil of the objective system 11 and could be concentrated in the image plane of the information structure. In this image plane the individual diffraction orders are not separated. However, in the plane of the exit pupil of the objective system, or in a plane in which an image of this exit pupil is formed, the diffraction orders are more or less separated. FIG. 3 shows the situation in the plane of the exit pupil.

The circle 20 with the center 23 in FIG. 3 represents the cross-section of the zero-order sub-beam $b$ (0, 0) in the plane of the exit pupil. The circles 21 and 22 respectively represent the cross-sections of the sub-beams $b(+1,0)$ and $b(-1,0)$ which are diffracted in the longitudinal direction of a track portion to be read. The X-axis and the Y-axis of FIG. 3 correspond to the X-axis and the Y-axis of FIG. 2. The distance $d$ from the centers 24 and 25 to the Y-axis is determined by $\lambda/p$, $p$ being the local period of the pits in the track direction and $\lambda$ being the wave length of the read beam $b$.

For deriving a focussing error use is made of the phase variations between the first-order sub-beams which are diffracted in the track direction and the zero-order sub-beam.

In the areas, shown hatched in FIG. 3, the first-order sub-beams $b(+1,0)$ and $b(-1,0)$ partly overlap the zero-order sub-beam $b(0,0)$ and interference occurs. The phase difference of the sub-beams $b(+1,0)$ and $b(-1,0)$ relative to the sub-beams $b(0,0)$ varies with high frequency owing to the movement of the read spot in the track direction, and with low frequency owing to focussing errors. This results in intensity variations in the areas of overlap, which variations can be detected with the detectors 13 and 14.

When the center of the read spot coincides with the center of a pit, a specific phase difference $\psi$ is obtained between a first-order sub-beam and the zero-order sub-beam. The value of $\psi$ depends on the shape of the information structure, mainly on the phase depth of the pits. As the read spot passes from a first pit to a second pit the phase of for example the first-order sub-beam $b(+1,0)$ relative to the zero-order sub-beam increases continuously by $2\pi$. Therefore, it may be assumed that as the read spot moves in the track direction the phase of a first-order sub-beam relative to the zero-order sub-beam varies by $\omega t$. Here $\omega$ is a temporal frequency which is determined th spatial frequency of the pits in a track portion to be read and by the speed with which the read spot passes over this track portion.

The phase difference between the beam $b(0,0)$ and the beams $b(+1,0)$ $b(-1,0)$ in the overlapping areas of FIG. 3 is determined by the nature of the information structure and also by the degree of focussing of the read beam at the plane of the information structure. This will be explained with reference to FIG. 4.

Figure 4:
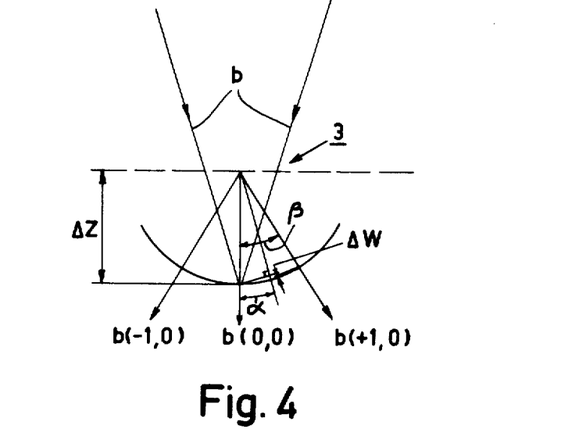

In this Figure a portion of a track 3 is shown in longitudinal section. By way of example it is assumed that the read beam is focussed in a plane which is located at a distance $\Delta z$ from the plane of the track. Owing to this focusing error an additional pathlength difference is obtained between the beam $b(0,0)$ and the beams $b(+1,0)$ and $b(-1,0)$. Of these beams only the chief rays are shown. For the direction at an arbitrary angle $\alpha$ with the chief ray of the beam $b$ (0,0), the pathlength difference between the beam $b$ (0,0) and the beam $b(+1,0)$ is given by:

$$\Delta \omega = \Delta z \cdot \cos \alpha - \Delta z \cdot \cos(\beta - \alpha)$$

For a small angle $\alpha$ and for a small angular difference $(\beta - \alpha)$ the pathlength difference in good approximation, i.e. with an accuracy up to the third order, equals:

$$\Delta W = \Delta z \left[ 1 - \frac{\alpha^2}{2} - \left( 1 - \frac{(\beta - \alpha)^2}{2} \right) \right]$$

or:

$$\Delta W = \Delta z \frac{\beta}{2} (\beta - 2\alpha)$$

The phase shift caused by the defocussing in a direction at an angle $\alpha$ with the optical axis of the objective system is then:

$$\phi \Delta z = 2\pi \frac{\Delta W}{\lambda} = 2\pi \frac{\Delta z}{\lambda} \beta \left( \frac{\beta}{2} - \alpha \right)$$

The phase shifts $\phi \Delta z\, 2$ is a function of the angle 6$\alpha$ for a specific value of the focussing error $\Delta z$. For each position in the exit pupil the phase difference $\phi \Delta z$ is determined by the distance from this position to the Y-axis. For the positions disposed on the two lines whose angular distance to the Y-axis is $\beta/2$, the phase difference between a first-order sub-beam and the zero-order sub-beam is $\psi(\phi \Delta z = 0)$ and is independent of a focussing error. These two lines may be denoted as "netural lines". In FIG. 3 one of these lines is designated $1_n$.

Figures 5, 6A, 6B, 8A, 8B:
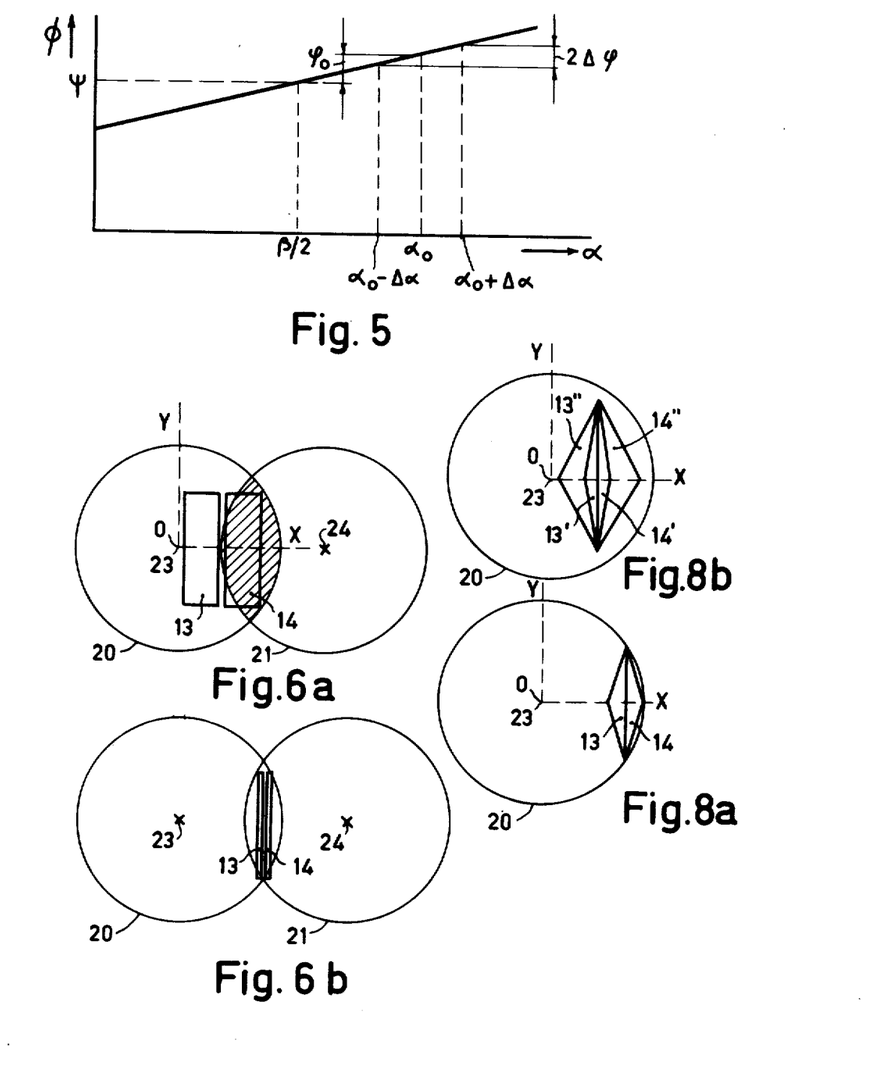

FIG. 5 shows the total phase difference $\phi$ between the sub-beam $b(+0,0)$ and the sub beam $b(+1,0)$ as a function of the position, in the angular dimension $\alpha$, in the exit pupil for a specific focussing error $\Delta z$. The position of the line which is parallel to the Y-axis and which extends midway between the detectors 13 and 14 is denoted by $\alpha_o$. The centers of the detectors 13 and 14 are then located at the positions $\alpha_o - \Delta\alpha$ and $\alpha_o + \Delta\alpha$. If the phase difference $\phi \Delta z$ for the position $\Delta_o$ is represented by $\phi_o$, the phase difference for the position $\alpha_o - \Delta\alpha$ will be $$(\phi \Delta z) \alpha_o - \Delta \alpha = \phi_o - \Delta \phi$$

and for the position $$(\phi \Delta z) \alpha_o + \Delta \alpha = \phi_o + \Delta \phi$$

where $\Delta \phi$ is given by $\Delta \phi = 2\pi (\Delta z/\lambda) \beta \Delta \alpha$. Over the overlapping areas of FIG. 3 patterns of interference lines extend. The spatial period of a pattern of interference lines is determined by the magnitude of a focussing error, i.e. for a large $\Delta z$ the spatial period is small. Owing to the rapid scanning of the pits in a track portion to be read by the read spot a pattern of interference lines moves with high frequency. The sign of the displacement of the pattern of interference lines is then determined by the sign of the focussing error $\Delta z$.

The phase differences between the sub-beams which interfere at the location of the detectors 13 and 14 are given by:

$$\phi'_{13} = \psi + \omega t + \omega_o - \Delta \phi$$

$$\phi'_{14} = \psi + \omega t + \phi_o + \Delta \phi$$

The time-dependent output signals of the detectors 13 and 14 may be represented by:

$$S_{13} = A \cos (\psi + \omega t + \phi_o - \Delta \phi)$$

$$S_{14} = A \cos (\psi + \omega t + \phi_o + \Delta \phi)$$

The output signal of the subtractor circuit 15 (see FIG. 2) is then:

$$S_{15} = B \sin (\psi + \omega t + \phi_o) \sin \Delta \phi.$$

As is shown in FIG. 2 the output signals of the detectors 13 and 14 are also added to each other in the circuit 16. In the signals $S_{13}$ and $S_{14}$ the terms $\omega t$ have the same sign, while the sign of the terms $\Delta \phi$ in the signals $S_{13}$ is opposite to that of this term in the signal $S_{14}$. As a result the variation in the sum of the signals $S_{13}$ and $S_{14}$ owing to focussing errors will be substantially smaller than this variation in the signal $S_{15}$. The sum signal may be represented by:

$$S_{16} = C \cos (\psi + \omega t + \phi_o) [1 + m (\cos \Delta \phi)]$$

Here $m$, for focussing errors which are not too large, is a constant smaller than 1, so that if $\Delta z$ is not too large the sign of $S_{16}$ cannot change. The signal $S_{16}$ is applied to a phase-shifting circuit 17 which shifts the phase through 90°, yielding:

$$S_{17} = D \sin (\psi + \omega t + \phi_o) [1 + m \cos (\Delta \phi)]$$

In the multiplier circuit 18 the signals $S_{15}$ and $S_{17}$ are multiplied by each other, yielding:

$$S_{18} = E \sin^2(\psi + \omega t + \phi_o) \sin (\Delta \phi) [1 + m \cos (\Delta \phi)]$$

This may be written as:

$$S_{18} = E [1 + m \cos (\Delta \phi)] \cdot \sin (\Delta \phi) [\tfrac{1}{2} = \tfrac{1}{2} \cos 2 (\psi + \omega t + \phi_o)]$$

After passing through the filter circuit, which transmits only frequencies lower than $2\omega$, this yields a signal $$S_f = K (\Delta \phi) \sin (\Delta \phi)$$

where $$K(\Delta \phi) = \tfrac{1}{2} E [1 + m \cos (\Delta \phi)]$$

and remains positive for focussing errors which are not too large.

Consequently, the signal $S_f$ is an odd function of $\Delta \phi$ and consequently also an odd function of the focussing error $\Delta z$, so that with the described detector arrangement and with the described signal processing the magnitude and the direction of the focussing error can be detected. The signal $S_f$ may be used for correcting the focussing, in a manner known per se, for example by moving the objective system in an axial direction.

In FIG. 2 the reference numeral 17 denotes a phase-shifting circuit. This circuit may be a differentiating network. However, preferably the phase-shifting circuit takes the form of a so-called phase-locked loop.

FIG. 2a illustrates the principle of such a loop. An oscillator 26 supplies a cosine function at its output 27 and a sine function at its output 28. The output 27 is connected to a first input of a frequency comparator 29 in which the frequency of the oscillator 26 is compared with the frequency of the signal $\cos (\omega t)$, whose phase is to be shifted through 90°. The output signal of the frequency comparator is fed back to the oscillator, so that the frequency of this oscillator becomes equal to that of the signal $\cos (\omega t)$. A sine function with the desired frequency $\omega$ is then obtained at the output 28 of the oscillator.

Besides being diffracted in the longitudinal direction of a track portion to be read, the radiation of the read beam is also diffracted in directions transverse to this longitudinal direction and also in diagonal directions. Thus, sub-beams of the orders $(0, +1)$ and $(0, -1)$ are also obtained owing to the grating structure transverse to the track direction, and sub-beams of the order: $(+1, +1), (-1, +1), (-1, -1),$ and $(+1, -1)$. In FIG. 3, the directions of the sub-beams are indicated by arrows. As the detectors 13 and 14 are disposed at either side of the X-axis, their output signals will not be influenced by the sub-beams $b(0, +1)$ and $b(0, -1)$. The directions of the lines of the interference patterns, which are caused by the sub-beams diffracted in diagonal directions are oblique relative to the detectors. The influence of the last-mentioned interference patterns on the signals $S_{13}$ and $S_{14}$ will therefore be averaged out.

The information structure also diffracts radiation of the read beam in orders high than the first orders. However, the radiation energy in the higher diffraction orders is comparatively low and the higher-order diffraction angles are such that only a small part of the higher order sub-beams falls within the pupil of the objective system. Therefore, the influence of the higher-order sub-beams is negligible.

As previously stated, the spatial period of the pattern of interference lines is determined by the focussing error $\Delta z$. The greater this error, the smaller said spatial period will be. It has been assumed hereinbefore that B and C in the expression of $S_{15}$, $S_{16}$ are constants. However, in reality B and C vary in accordance with $(\sin x/x)$ for rectangular detectors, x being given by $\pi (1/q)$, in which 1 is the width of the rectangular detector and $q$ the spatial period of the pattern of interference lines. If the focussing error $\Delta z$ becomes so large that the period $q$ of the interference pattern becomes equal to the width 1, the sign of B is reversed. The phase of the derived control signal then changes 180° and there is a risk that the focussing servo-control will act in the wrong sense.

For deriving the signal $S_{16}$ the output signals of the detectors 13 and 14 are added, so that a detector is used which is twice as wide as that used in deriving the signal $S_{15}$. Said sign reversal will consequently occur for the first time for the signal $S_{16}$.

It is therefore proposed to make the detectors as narrow as possible. In that case it is also possible to obtain a correct focussing control signal for larger focussing errors, which may occur as the objective system initially moves towards the record carrier, or in the event of a shock against the read apparatus.

The use of narrow detectors has another advantage, namely that the two detectors can be arranged close at the periphery of the effective exit pupil. This is of importance if record carriers in which high spatial frequencies of the information areas occur in the information structure are to be read in a satisfactory manner.

The degree in which the sub-beams $b(+1,0)$ and $b(-1,0)$ and the sub-beam $b(0,0)$ overlap each other is determined by the spatial frequency of the information areas in the track direction. In FIG. 3 the centers 24 and 25 of the circles 21 and 22 are nearly located on the edge of the circle 20 which represents the effective exit pupil.

Consequently, this Figure represents the situation in which the spatial frequency in the track which is read is approximately equal to half the cut-off frequency. When the spatial frequency increases, the first-order sub-beams $b(+1,0)$ and $b(-1,0)$ will be diffracted through a larger angle $\beta$. At a specific spatial frequency of the information areas, which correspond to the cut-of frequency of the optical read system, there will no longer be any overlap of the first-order sub-beams with the zero-order sub-beam. The information can be no longer be detected.

Figure 7:
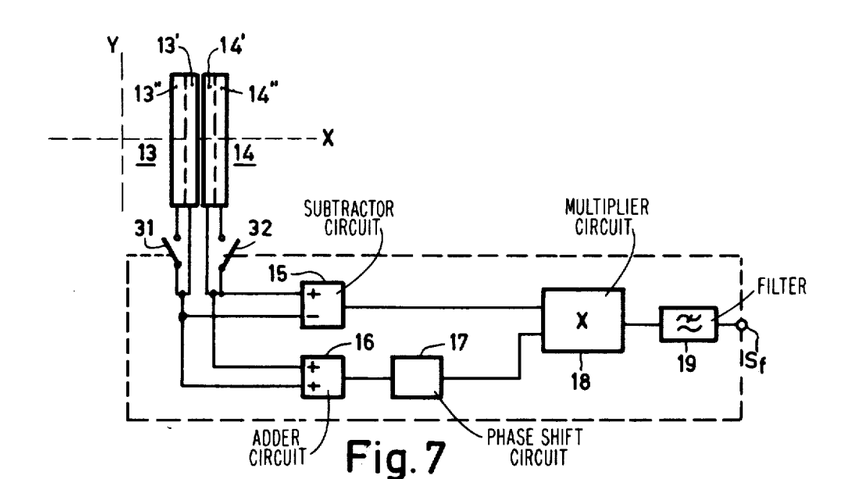

As for detecting focussing errors two detectors are used which are disposed at one side of the Y-axis, the cut-off frequency for the focussing error detection will be smaller than the cut-off frequency for the actual information read-out. The cut-off frequency for the focussing detection is already attained if the detector 13 is disposed partly outside the overlapping area of the sub-beams $b(+1,0)$ and $b(0,0)$ (compare FIG. 6a). The spatial frequencies of the information areas for which this situation occurs are lower in the case that comparatively wide detectors are used than in the case that narrow detectors are used which are disposed nearest the periphery of the exit pupil (compare FIGS. 6a and 6b). The distance from the detectors to the edge of the pupil, and thus the width of the detectors, is defined by the highest spatial frequency of the information areas which occurs in the record carrier to be read. If the maximum spatial frequency is comparatively low, the detectors may have a relatively great width. It is then possible to divide each of the detectors into two subdetectors as is shown in FIG. 7. As previously stated, the detectors should be narrow if larger focussing errors are to be detected. For the detection of smaller focussing errors it is advisable, in view of the detection accuracy, to use detectors which are as wide as possible. In the arrangement of FIG. 7 the switches 31 and 32 are open if larger focussing errors are measured, so that only the signals from the narrow subdetectors 13' and 14' are supplied to the subtractor circuit 15 and the adder circuit 16. If the measured focussing error becomes smaller than a specific value the switches 31 and 32 are closed and the signals from the subdetectors 13' and 13" are added, as well as the signals from the subdetectors 14' and 14", so that the focussing errors are detected with the wide detectors 13 and 14. The signals from the detectors 13 and 14 or from the subdetectors 13' and 14' are further processed in a similar way as described with reference to FIG. 2.

As previously stated B and C in the expressions for $S_{15}$ and $S_{16}$ vary in accordance with $(\sin x/x)$ for rectangular detectors, so that for larger focussing errors the sign may be reversed. This reversal of the sign may be prevented by making the detectors triangular, as is shown in FIG. 8a. When using triangular detectors B and C vary in accordance with $(\sin x/x)^2$ so that no reversal of the sign occurs and a correct focussing control signal can also be obtained for a wide range of focussing errors. The width of the detectors is then no longer determined by the focussing errors to be anticipated. However, if a satisfactory focussing control signal is to be derived for a wide range of spatial frequencies of the information areas in the information structure, the detectors should still be as narrow as possible and should be arranged nearest the periphery of the effective exit pupil, as is shown in FIG. 8a. The use of narrow detectors at the periphery of the pupil also enables an information structure with low spatial frequencies of the information areas to be read. The lower limit of spatial frequencies which can still be detected is reached if the sub-beams $b(+1,0)$ and $b(-1,0)$ overlap each other at the location of the detectors 13 and 14. It is obvious that if narrow detectors at the edge of the pupil are used this lower limit will be lower than in the case that wide detectors are used.

If nevertheless wide triangular detectors are used, these detectors (see FIG. 8b) may be subdivided in the same way as is shown in FIG. 7 for rectangular detectors.

The Applicant's simultaneously filed Patent application Ser. No. 669,639 describes how centering errors of the read spot relative to a track to be read can be detected using the same principle as described hereinbefore for focussing error detection. In a read apparatus the systems for the detection of centering errors and of focussing errors can be combined, as is shown for triangular detectors in FIG. 9.

Each of the detectors 13 and 14 of FIG. 2 has been replaced by two detectors 40, 41 and 42, 43 respectively.

Figure 9:
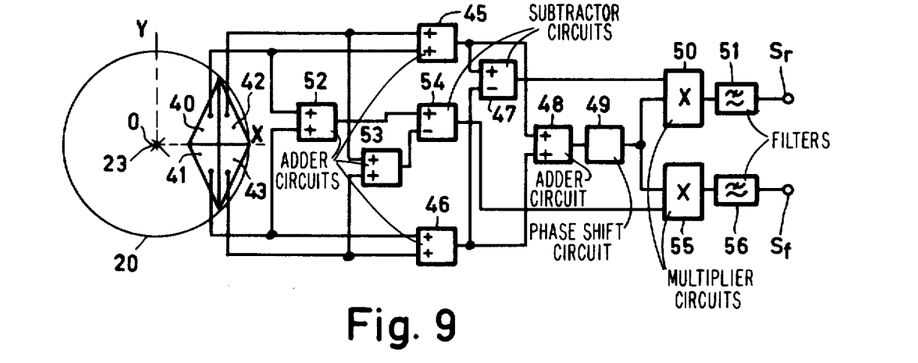

For determining centering errors the output signals of the detectors 40 and 42 are applied to an adder circuit 45, and the output signals of the detectors 41 and 43 to an adder circuit 46. The ouput signals of the circuits 45 and 46 are subtracted from each other in the circuit 47 and added to each other in the circuit 48. At the output of the adder circuit 48 a reference signal is then obtained whose phase is shifted through 90° in the phaseshifting circuit 49. In the circuit 50 the phaseshifting reference signal is multiplied by the signal from the subtractor circuit 47. The resulting signal is applied to the low-pass filter 51, at whose output the desired control signal $S_r$ for correcting the centering of the read spot relative to a track to be read is available.

For determining focussing errors the output signals of the detectors 40 and 41 are added to each other in the circuit 52 and the output signals of the detectors 42 and 43 are added to each other in the circuit 53. The output signals of the circuits 52 and 53 are processed in a similar way as the output signals of the dectectors 13 and 14 in FIG. 2. The elements 54, 48, 49, 55, and 56 in FIG. 9 then have the same functions as the elements 15, 16, 17, 18 and 19 in FIG. 2.

FIG. 1 shows that a separate information detectors is used for reading the information on the record carrier.

For reading the information it would alternatively be possible to use the detectors 13 and 14 in FIGS. 1, 2, 6a, 6b and 7, or the detectors 40, 41, 42 and 43 in FIG. 9. The output signal of the adder circuit 16 or 48 should then also be applied to a decoder circuit and then for example be rendered visible, with a television receiver.

In view of a satisfactory signal-to-noise ratio in the information signal it is advisable, however, that the area of the information detector at least equals the beam cross-section of the 0-order sub-beam. If the information detector is also disposed in the effective exit pupil of the objective system the composite detection system may be as shown as in FIG. 10a. The detection system comprises one round detector with two mutually separated radiation-sensitive parts $D_i$ and $D_c$. The part $D_c$ may again be subdivided into two or four separate parts, as is shown in FIGS 8b and 9, and serves for deriving control signals for focussing and centering.

Figure 10A:
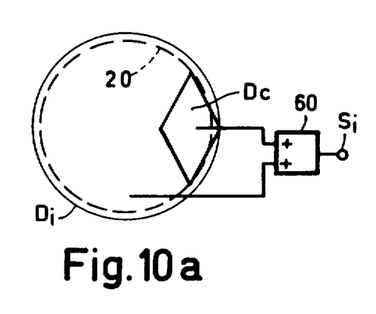
Figure 10B:
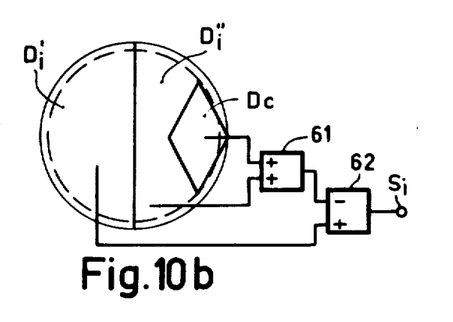

For deriving the information signal $S_i$ the sum signal from the detection part $D_c$ is preferably added to the signal from the detection part $D_i$. In the arrangement of FIG. 10a the signals are added in the circuit 60. It is alternatively possible that the detection part $D_i$ is subdivided into two separate parts $D_i'$ and $D_i''$, as is shown in FIG. 10b. The information signal $S_i$ is then obtained by first adding the sum signal from the detection part $D_c$ to the signal from the detection part $D_i''$ in the adder circuit 61. The resulting signal is then subtracted from the signal supplied by the detection part $D_i'$ in the substractor circuit 62. As described in the applicant's simultaneously filed Patent Application U.S. Ser. No. 669,639, the signals from the left-hand and right-hand part of the exit pupil are preferably added if an information structure with a large phase depth (for example $\pi$ radians) is to be read, while the signals from the left-hand and right-hand part of the exit pupil are preferably subtracted from each other if an information structure with smaller phase depths is to be read.

The detection parts $D_i$ ( of FIG. 10a) and $D_i'$ and $D_i''$ (FIG. 10b) have comparatively large areas. For reading information structures with high spatial frequencies of the information areas, these detection parts should have a comparatively low capacitance. Preferably so-called PIN photo-diodes are used for these detection parts which diodes have a low capacitance per unit area.

The invention has been described by way of example with reference to a round disc-shaped record carrier with a radiation-reflecting information structure. It will be evident that radiation-transmitting record carriers can also be read with an apparatus in accordance with the invention. The record carrier need not be round and disc-shaped, but may also be a tape-shaped record carrier with a multitude of information tracks. As regards the information structure, it is to be noted that the only requirement is that this structure should be readable with optical means. The structure may be a phase structure, such as a pit structure, a black-white structure, or for example a magneto-optical structure. Apart from a television program, the record carrier may for example also store digital information for a computer.

What is claimed is:

1. Apparatus for reading a record carrier on which information is stored in an optically readable track-shaped information structure, said apparatus comprising a radiation source; a radiation-sensitive information signal detector; objective system means for directing a radiation beam from said radiation source to a spot on the information structure of the record carrier and for thereafter directing said radiation from said record carrier to said radiation-sensitive information signal detector; means for relatively moving said record carrier and said radiation spot; and a focus error detection system comprising two radiation-sensitive focus signal detectors disposed in the far field of the information structure at one side of a plane defined by the optical axis of the objective system means and a line normal to the center line of the track portion on which said radiation is directed, said detectors being disposed symmetrically relative to a line effectively extending transversely to the track direction, a subtraction circuit having inputs connected to said two focus signal detectors, an adder circuit connected to said two focus signal detectors, a multiplier circuit, shift circuit means for connecting outputs of said adder circuit and said subtraction circuit to said multiplier circuit and for relatively phase shifting the outputs of said adder circuit and said subtraction circuit, and filter circuit means connected to the output of said multiplier circuit for transmitting only frequencies lower than a frequency corresponding to twice the average spatial frequency of the information structure in the track direction multiplied by the relative velocity of the radiation spot and the record carrier in the track direction, a focus signal being thereby provided from an output of said filter circuit means.

2. An apparatus as recited in claim 1, wherein each of the two focus signal detectors is self-divided by lines extending substantially transversely to the track direction into two sub-detectors to form two outer sub-detectors and two inner sub-detectors, said shift circuit means comprising signal operated swtiches responsive to said focus error signal for connecting said two outer sub-detectors to said inputs of said outer circuit and said subtraction circuit, and means connecting said inner sub-detectors directly to said adder circuit and said subtraction circuit.

3. Apparatus as claimed in claim 1, wherein the dimensions of the detectors in the effective track direction are substantially smaller than the diameter of the effective exit pupil of the ojective system.

4. An apparatus as claimed in claim 3, wherein the detectors are disposed at the periphery of the effective exit pupil.

5. An apparatus as claimed in claim 1, wherein the detectors have the shape of isosceles triangles whose base sides effectively extend transversely to the track direction.

6. An apparatus as claimed in claim 5 , wherein the height of the triangular detectors is substantially smaller than the diameter of the effective exit pupil.

7. An apparatus as claimed in claim 6, wherein the detectors are disposed at the periphery of the effective exit pupil.

8. An apparatus as claimed in claim 5, wherein each of the triangular detectors is subdivided into two sub-detectors shaped as isosceles triangles, the outputs of the outer sub-detectors being connected via switches which are actuated by the focus error signal, and the outputs of the inner sub-detectors are connected directly to inputs of the adder circuit and subtractor circuit.

9. Apparatus for reading a record carrier on which information is stored in an optically readable track-shaped information structure, said apparatus comprising a radiation source; a radiation-sensitive information signal detector; objective system means for directing radiation from said radiation source to a spot on the information structure of said record carrier and for thereafter directing said radiation from said record carrier to said radiation-sensitive information signal detector; means for relatively moving said record carrier and said radiation spot; and a focus and centering error detection system comprising four radiation-sensitive focus and centering error detectors disposed in the far field of the information structure at one side of a plane defined by the optical axis of the objective system means and a line normal to the center line of the track portion on which said radiation spot is directed, said focus and centering error detectors being each disposed symmetrically in one of four quadrants of an imaginary X-Y co-ordinate system whose X-axis extends in the track direction and whose X-axis extends transversely to the X-axis, said focus and centering error detectors thereby forming a four quadrant detector, a first adder circuit having inputs connected to a first and fourth quadrant of said four quadrant detector, a second adder circuit having inputs connected to a second and third quadrant of said four quadrant detector, a third adder circuit connected to the third and fourth quadrants of said four quadrant detector, a fourth adder circuit connected to said first and second quadrants of said four quadrant detector, a first subtraction circuit having inputs connected to outputs of said first and second adder circuits, a second subtraction circuit having inputs connected to outputs of said third and fourth adder circuits, a fifth adder circuit having inputs connected to outputs of said first and second adder circuits, a first multiplier circuit providing a radial error signal, a second multiplier circuit providing a focus error signal, and coupling means for connecting outputs of said first subtraction circuit and said fifth adder circuit to inputs of said first multiplier and for connecting outputs of said second subtraction circuit and said fifth adder circuit to said second multiplier circuit and for introducing a phase shift between the output of said fifth adder and each of the outputs of said first and second subtraction circuits.

10. An apparatus as claimed in claim 9, wherein in the far field of the information structure one integrated radiation-sensitive detector with an area at least equal to the cross-section of the undiffracted sub-beam is disposed, which detector comprises areas which are separated from the remaining major area of the detector, which areas constitute detectors for the focussing detection system and centering detection system, and that a sixth adder circuit is provided to which the sum signal from the said areas and the signal from the major area of the detector are applied, the read-out information signal being available at the output of this adder circuit.

11. An apparatus as claimed in claim 10, wherein said major area of the detector consists of two sub-areas, the boundary line being effectively transverse to the track direction and intersecting the optical axis of the objective system, and that a third subtractor circuit is provided to which the output signal of the sixth adder circuit is applied together with the signal obtained from the sub-area which is disposed at an other side of the boundary line than the said areas, the read-out information signal appearing at the output of the second subtractor circuit.

* * * * *